US007849085B2

(12) United States Patent
Taniai et al.

(10) Patent No.: US 7,849,085 B2
(45) Date of Patent: Dec. 7, 2010

(54) SYSTEM AND METHOD FOR IMPLEMENTING MBSTRING IN WEBLOGIC TUXEDO CONNECTOR

(75) Inventors: Masayuki Taniai, Yamanashi (JP); Hirokazu Igari, Kanagawa (JP)

(73) Assignee: Oracle International Corporation, Redwood Shores, CA (US)

( * ) Notice: Subject to any disclaimer, the term of this patent is extended or adjusted under 35 U.S.C. 154(b) by 528 days.

(21) Appl. No.: 10/848,244

(22) Filed: May 18, 2004

(65) Prior Publication Data

US 2005/0262511 A1 Nov. 24, 2005

(51) Int. Cl.
*G06F 7/00* (2006.01)
*G06F 15/173* (2006.01)
(52) U.S. Cl. .................... 707/736; 707/756; 709/226
(58) Field of Classification Search ........... 707/100, 707/101, 103; 709/1–223, 318, 226; 719/310
See application file for complete search history.

(56) References Cited

U.S. PATENT DOCUMENTS

| 5,337,233 | A | * | 8/1994 | Hofert et al. ............... 715/540 |
| 5,787,452 | A | * | 7/1998 | McKenna ................... 715/234 |
| 5,793,381 | A | * | 8/1998 | Edberg et al. .............. 345/467 |
| 5,913,061 | A | * | 6/1999 | Gupta et al. ............... 719/310 |
| 6,038,587 | A | * | 3/2000 | Phillips et al. ............. 718/101 |
| 6,204,782 | B1 | * | 3/2001 | Gonzalez et al. ........... 341/90 |
| 6,289,393 | B1 | * | 9/2001 | Phillips et al. ............. 719/315 |
| 6,539,396 | B1 | * | 3/2003 | Bowman-Amuah ..... 707/103 R |
| 6,670,897 | B1 | * | 12/2003 | Lin ........................... 341/65 |
| 6,842,906 | B1 | * | 1/2005 | Bowman-Amuah ........ 719/330 |
| 6,856,992 | B2 | * | 2/2005 | Britton et al. .............. 707/100 |
| 6,861,963 | B1 | * | 3/2005 | Steele et al. ............... 341/50 |
| 6,925,595 | B1 | * | 8/2005 | Whitledge et al. .......... 715/513 |
| 7,020,880 | B2 | * | 3/2006 | Mellen-Garnett et al. ... 719/310 |
| 7,051,278 | B1 | * | 5/2006 | Ehrman ..................... 715/536 |
| 7,080,092 | B2 | * | 7/2006 | Upton ........................ 707/102 |
| 7,120,573 | B2 | * | 10/2006 | Honeywood ................. 704/8 |
| 7,152,090 | B2 | * | 12/2006 | Amirisetty et al. ......... 709/200 |
| 7,199,729 | B2 | * | 4/2007 | Chen et al. .................. 341/50 |
| 7,257,818 | B2 | * | 8/2007 | Foerg et al. ................ 719/310 |
| 7,275,079 | B2 | * | 9/2007 | Brodsky et al. ............ 709/203 |

(Continued)

FOREIGN PATENT DOCUMENTS

CA 2 354 613 * 2/2003

(Continued)

OTHER PUBLICATIONS

Altiok et al., A Capacity Planning Tool for The Tuxedo Middleware Used in Transaction Processing Systems, Dec. 9-12, 2001, IEEE, vol. 1, pp. 502-507.*

*Primary Examiner*—Apu M Mofiz
*Assistant Examiner*—Jessica N Le
(74) *Attorney, Agent, or Firm*—Fliesler Meyer LLP (57) ABSTRACT

MBSTRING was originally defined in Tuxedo as a new multi-byte string buffer type to facilitate the support and manipulation of multi-byte encoded application data. Code set information is carried along with the data, and automated code set conversion is performed as needed when data is transmitted between system hat use different code sets. The present invention provides the same capability in WTC to facilitate customer integration of WLS and Tuxedo. WTC allows applications to be used with Tuxedo.

9 Claims, 1 Drawing Sheet

U.S. PATENT DOCUMENTS

| | | | |
|---|---|---|---|
| 7,302,440 B2 * | 11/2007 | Britton et al. | 707/101 |
| 7,356,590 B2 * | 4/2008 | Wilson et al. | 709/224 |
| 2001/0029542 A1 * | 10/2001 | Nishimura | 709/231 |
| 2002/0056012 A1 * | 5/2002 | Abileah et al. | 709/310 |
| 2003/0004703 A1 * | 1/2003 | Prabhakar et al. | 704/8 |
| 2003/0140316 A1 * | 7/2003 | Lakritz | 715/536 |
| 2003/0182103 A1 * | 9/2003 | Atkin | 704/9 |
| 2003/0195997 A1 * | 10/2003 | Ibert et al. | 709/318 |
| 2004/0001010 A1 * | 1/2004 | Shaylor et al. | 341/50 |
| 2004/0036633 A1 * | 2/2004 | Craft | 341/51 |
| 2004/0111464 A1 * | 6/2004 | Ho et al. | 709/203 |
| 2004/0154023 A1 * | 8/2004 | Chen et al. | 719/310 |
| 2004/0158737 A1 * | 8/2004 | Lo et al. | 713/200 |
| 2004/0205673 A1 * | 10/2004 | Patryshev | 715/536 |
| 2004/0205675 A1 * | 10/2004 | Veerappan et al. | 715/536 |
| 2004/0249819 A1 * | 12/2004 | Matsumoto et al. | 707/10 |
| 2004/0261024 A1 * | 12/2004 | Storisteanu | 715/530 |
| 2005/0015619 A1 * | 1/2005 | Lee | 713/201 |
| 2005/0021323 A1 * | 1/2005 | Li | 704/5 |
| 2005/0044197 A1 * | 2/2005 | Lai | 709/223 |
| 2005/0071756 A1 * | 3/2005 | Cipresso et al. | 715/513 |
| 2005/0184886 A1 * | 8/2005 | Fauque | 341/50 |
| 2005/0192962 A1 * | 9/2005 | Furrer et al. | 707/8 |
| 2005/0229189 A1 * | 10/2005 | McManus | 719/330 |
| 2005/0229254 A1 * | 10/2005 | Singh et al. | 726/23 |
| 2006/0031579 A1 * | 2/2006 | Tout | 709/245 |
| 2006/0200766 A1 * | 9/2006 | Lakritz | 715/536 |

FOREIGN PATENT DOCUMENTS

| | | | |
|---|---|---|---|
| EP | 1003114 A1 * | 5/2000 | |
| WO | WO 99/46661 | * | 9/1999 |

* cited by examiner

Figure 1

SYSTEM AND METHOD FOR IMPLEMENTING MBSTRING IN WEBLOGIC TUXEDO CONNECTOR

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to the interoperability of distributed transaction processing platforms and application infrastructures for developing, integrating, securing, and managing distributed service-oriented applications.

BACKGROUND OF THE INVENTION

Tuxedo by BEA Systems of San Jose, Calif., is a reliable and scalable platform for simplifying distributed transaction processing and message-based application development in a multi-language environment. WebLogic Server (WLS), also by BEA Systems, provides an application infrastructure for developing, integrating, securing, and managing distributed service-oriented applications. A Weblogic Tuxedo Connector (WTC) has been developed to allow old versions of Tuxedo and WLS to access Tuxedo features.

In a newer version of Tuxedo, an MBSTRING feature was provided to better enable internationalization. WTC should support the MBSTRING capability to enable interoperability of WebLogic Server applications with newer version of Tuxedo. Prior versions of WTC support conversion of codeset conversion for string data. This solution enables conversion of codeset encoding used in Tuxedo servers from and to the UNICODE codeset encoding of string data in WLS applications. However, this solution only supports the string data type (STRING buffer type), and does not support MBSTRING. Also, it only enables a user to set up a codeset encoding per instance of WLS using a system property.

Since the MBSTRING feature was provided in a newer version of Tuxedo to better enable internationalization, WTC will need to support the MBSTRING capability to enable interoperability of WebLogic Server applications with the newer version of Tuxedo. What is needed is a feature within WTC that implements MBSTRING so that WLS can access this functionality in Tuxedo.

SUMMARY OF THE INVENTION

MBSTRING was originally defined in Tuxedo as a new multi-byte string buffer type to facilitate the support and manipulation of multi-byte encoded application data. Code set information is carried along with the data, and automated code set conversion is performed as needed when data is transmitted between system hat use different code sets. The present invention provides the same capability in WTC to facilitate customer integration of WLS and Tuxedo. WTC allows applications to be used with Tuxedo.

DETAILED DESCRIPTION

Figure 1:
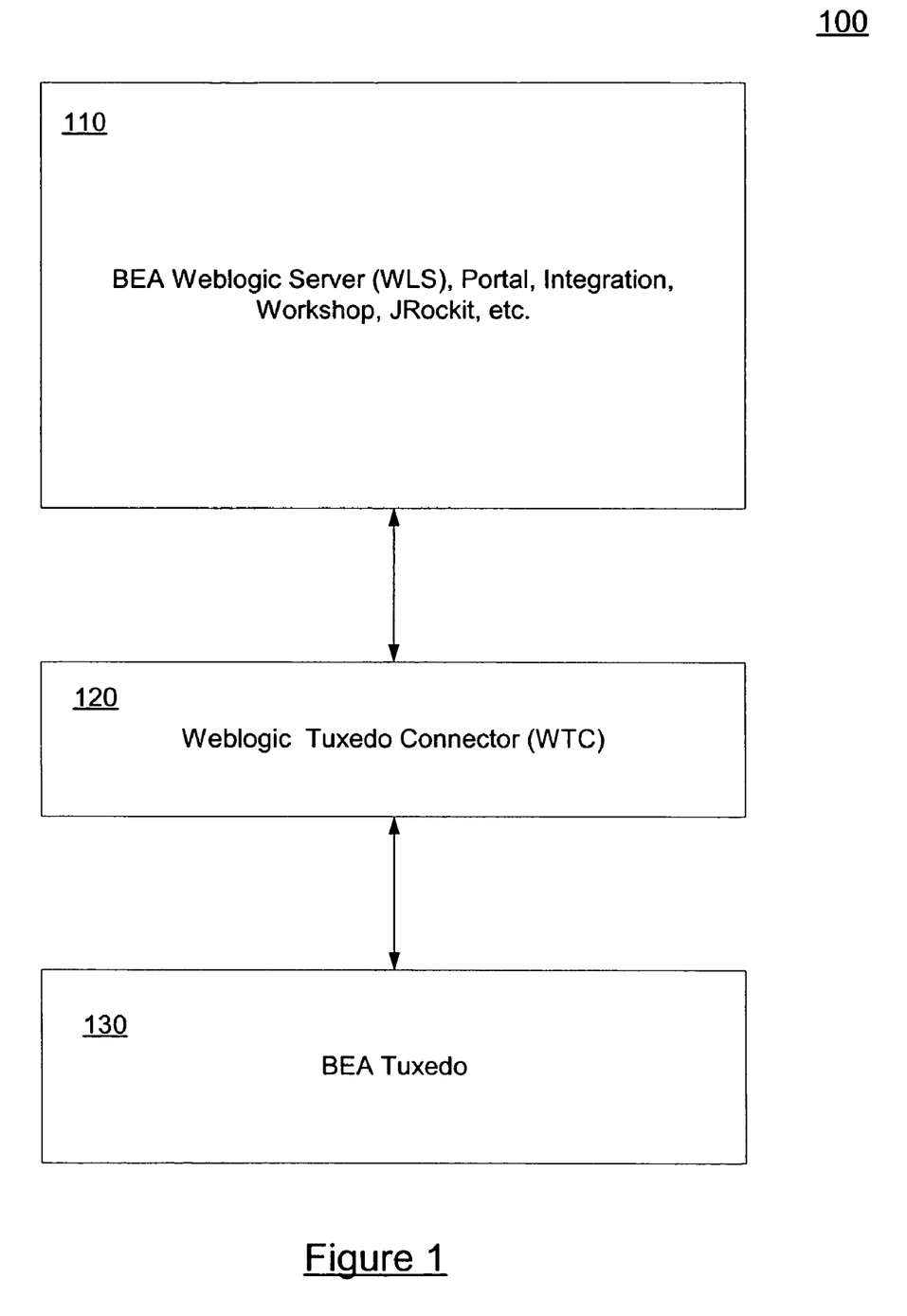
FIG. 1 is an illustration of a system for providing interoperability between WLS and Tuxedo using WTC in accordance with one embodiment of the present invention.

MBSTRING was originally defined in Tuxedo as a new multi-byte string buffer type to facilitate the support and manipulation of multi-byte encoded application data. Code set information is carried along with the data, and automated code set conversion is performed as needed when data is transmitted between system hat use different code sets. The present invention provides the same capability in WTC to facilitate customer integration of WLS and Tuxedo. WTC allows applications to be used with Tuxedo. As illustrated in the system 100 FIG. 1, WTC 120 is used to provide interoperability between Tuxedo 130 and WLS and other BEA applications 110.

The internationalization enhancements of the present invention include providing a new class in WTC for communicating between the servers and services of Tuxedo and Weblogic Server using MBSTRING capabilities, performing get and set of particular codeset information either programmatically or administratively, providing codeset encoding conversion for Tuxedo servers and services on UNIX and Windows using Java standard functions, and providing definition files for encoding alias names to address the differences between encoding names used in Java and GNU iconv( ), such like as "charset.alias" file in GNU iconv( ).

A few definitions of terms used herein are as follows:

WTC:

WebLogic Tuxedo Connector. A component of WebLogic Server that allows WebLogic Server to access Tuxedo services and Tuxedo components to access WebLogic Server services.

I18N:

Internationalization is the process of designing an application so that it can be adapted to various languages and regions without engineering changes. Sometimes the term internationalization is abbreviated as i18n, because there are 18 letters between the first "i" and the last "n".

L10N:

Localization means adapting TUXEDO to a specific international market or locale. This includes installation, documentation, web GUI, etc. Sometimes the term localization is abbreviated as l10n, because there are 10 letters between the first "l" and the last "n".

Single Byte Character:

A character whose length is of one octet.

Double Byte Character:

A character in a supplementary codeset whose character code length of two octets.

Wide Character:

A Wide Character is a data type that can hold a multi byte character. This wchar_t data type is a transformation of the internal multi byte character set code representation. Wide Characters can be used to represent characters in a uniform length within application programs, thus offering users a way in which to use the various codesets without being concerned with the length of the representation, as would sometimes be the case when using the multi byte character set directly.

Codeset:

Also called a coded character set. A codeset are those characters of a language specifically designed for processing on computer systems. A coded character set maps abstract characters to specific integers. Non-coded characters preceded computers. They affected the development of codesets and, in general, are a subset of a codeset standard.

Encoding:

The mapping of unique binary values for a codeset is called an encoding for that codeset. There may be many encodings that are available for a particular codeset. The conversion capability that is mentioned in this specification is a conversion between encodings within a codeset. For example, the coded Japanese character set is a codeset. SHIFT_JIS and EUC_JP are two of the possible encodings that can be used to reference that codeset. The names supported for encodings are defined by the GNU iconv specification.

CR052022:

Due to the older versions of WTC than WLS6.1 sp3 were not considered the multi-byte encoding use, String from TUXEDO had corrupted when the encoding was different form the VM's default. This change request is to improve as to enable to specify native encoding used by Tuxedo, as—Dweblogic.wtc.encoding. It only enables to use per instance of WLS.

In the Tuxedo MBSTRING feature, the MBSTRING buffer used for communication between machines contains string data and the codeset encoding name of the string, and the string data is converted to the encoding used on the receiver side. While the encoding should be in UNICODE, WTC is implemented through Java. This point is not different from Tuxedo's MBSTRING features.

Unicode is used by Java as the fixed internal character encoding. Unlike EUC or SJIS which expresses a specific single language, Unicode is independent from language and includes all characters of all languages in a single encoding. In Java, a 'char' type data is a sixteen bit Unicode character. The String class stores its string data as an array of char. Thus, an instance of String has its data as a Unicode array. In one embodiment, the present invention uses the standard Java class "StringBuffer", which stores the string data in a Unicode array as well, as the container of the string data for the new MBStringBuffer class. In this case, the present invention so need not account for the "local encoding" for the string data in the new MBStringBuffer. The local encoding of a MBSTRING data in MBStringBuffer is "always" Unicode and the application doesn't need it and won't change it.

Also, the only timing to be conscious of regarding the encoding name of the string data is when the string data in the new MBStringBuffer is sent to a remote domain or when a string data is received from a remote domain and WTC creates MBStringBuffer instance from the received data.

Typed MBString Description

The C language implementation of the Tuxedo MBSTRING buffer keeps a string data as a "byte array", which is encoded with the encoding specified by the application. However, in Java, a string data is usually treated with an instance of one of the Java provided classes, such as String or StringBuffer. All these classes keep its string data in Unicode, which is sixteen bit "wide character", array. For providing MBSTRING support for WTC, a new class weblogic.wtcjatmi.TypedMBString is added. TypedMBString internally uses the StringBuffer class for handling its string data. Handling a string data using a byte array in TypedMBString is also possible. However, it is rare that an application code handles a string data as a byte array and needs to get or set the byte array from and to TypedMBString. Thus, TypedMBString may keep its string data as a StringBuffer instance as the existing WTC class weblogic.wtcjatmi.TypedString does. Conversion between StringBuffer (Unicode wide character array) and an encoded byte array can be done automatically while MBSTRING data is sent or received to and from another Tuxedo domain.

When the MBSTRING data in a TypedMBString object is sent to another Tuxedo domain, "wide character array" to "byte array" conversion is necessary and TypedMBString must choose any target encoding for this conversion. Typed-MBString uses Java's default encoding for the byte array string, such as SJIS or EUC for Japanese OS for example, as the encoding of the MBSTRING data being sent to other domains. The encoding name used for the conversion is included in the Tuxedo messages (as the codeset tcm) so that the receiver knows the encoding of the MBSTRING data in the message.

To allow users to choose their preferred encoding which is used for the Unicode to byte array conversion, a new attribute RemoteMBEncoding is added to WTCResourcesMBean. This attribute is optional and, if it is not set or its value is invalid, Java's default encoding is used. In addition, an application code can specify the encoding of each TypedMBString object by the instance method setRemoteMBEncoding( ).

When a message which includes a MBSTRING data is received by a WTC application, WTC determines the encoding of the received MBSTRING data by the codeset tcm and creates a TypedMBString object, then passes it to the application code. The application code knows the encoding of the received MBSTRING data by the instance method getRemoteMBEncoding( ).

TypedMBString uses the conversion function of java.lang.String class for converting between Unicode and an external encoding. The supported encoding names of the String class are different from the ones supported by GNU iconv library, which is used by the C language API of MBSTRING. To map the encoding names between Java and GNU iconv, TypedMBString uses a map file.

Although the conversion is always done while sending or receiving a MBSTRING data, the same conversion is done by the existing TypedString implementation. In addition, even if TypedMBString keeps the string data as a byte array, the conversion from and to Unicode is necessary in most WTC clients for the same reason above.

FLD_MBSTRING Description

TypedFML32 class supports a new type FLD_MBSTRING, which is already supported by the C language API of Tuxedo. The associated object type of FLD_MBSTRING which is passed to TypedFML32 methods, such as Fadd( ) or Fchg( ), is TypedMBString. The MBSTRING data in TypedFML32 is processed while sending or receiving to and from a remote Tuxedo domain in the same way as the MBSTRING data in TypedMBString. TypedFML32 class has new methods getRemoteMBEncoding( ) and setRemoteMBEncoding( ). The encoding name used for Unicode string to byte array conversion can be set to each TypedMBString object passed to a TypedFML32 method or the TypedFML32 object itself with setRemoteMBEncoding( ) method. If the encoding name of TypedMBString object is null, the encoding name of the TypedFML32 object is used. If the encoding name of the TypedFML32 object is also null, the default encoding name, RemoteMBEncoding attribute of WTCResourcesMBean or the Java's default, is used.

TypedMBString Requirements

A TypedMBString object can be used similarly as a TypedString object in WTC application code. In one embodiment, the only difference is that TypedMBString has a codeset encoding name associated to the string data. This encoding name does not stand for the encoding of the string data the TypedMBString object keeps but it stands for the 'external' encoding name for the object. This encoding name is used for converting the Unicode string data in the StringBuffer to the byte array while sending the MBSTRING data to another Tuxedo domain. This is overwritten by the encoding name of the received MBSTRING data from another Tuxedo domain.

In one embodiment, when a TypedMBString object is created by WTC application code, the encoding name is set to null. The null value of the encoding name means that the default encoding name is used for the Unicode string to byte array conversion while sending the MBSTRING data to a remote domain. By default, the Java's default encoding name for byte array string is used for this default encoding name. An application can change the default encoding name for a specific remote domain by the RemoteMBEncoding attribute of WTCResourcesMBean. The encoding name for a TypedMBString object can be specified by the instance method setRemoteMBEncoding( ). If the encoding name is specified by setRemoteMBEncoding( ), this is used for the Unicode string to byte array conversion. In summary, the order of the precedence of the encoding name is as follows.

Instance setRemoteMBEncoding( ) method
    RemoteMBEncoding attribute of WTCResourcesMBean
    Java's default When a Tuxedo message which contains a MBSTRING data is received from a remote domain, WTC recognizes the encoding of the MBSTRING data by the codeset tcm in the received message, creates a TypedMBString object and passes it to the WTC application code. The created TypedMBString object contains the encoding name of the received MBSTRING data. The WTC application code can get this encoding name by the instance method getRemoteMBEncoding( ).

The new methods described above, setRemoteMBEncoding( ) and getRemoteMBEncoding( ), are implemented in class MBStringTypes, which is the parent class of TypedMBString. The TypedFML32 class requires these methods as well and function the same as TypedMBString and TypedFML32.

FLD_MBSTRING Requirements

A type FLD_MBSTRING is added to the supported field types of TypedFML32 class. A TypedMBString object is passed to the TypedFML32 methods as the associated object type of FLD_MBSTRING.

TypedFML32 has new instance methods setRemoteMBEncoding( ) and getRemoteMBEncoding( ), which is actually implemented in the new parent class MBStringTypes whichextends the current parent class StandardTypes. While sending a FML32 data in a TypedFML32 object, the encoding name set by setRemoteMBEncoding( ) works as the 'default' encoding name for the whole of the TypedFML32 object. If it is not set or null, the encoding name set by the RemoteMBEncoding attribute of WTCResourcesMBean or Java's default encoding name is used as the default for the TypedFML32 object.

The default encoding name of a TypedFML32 object is included in the FML32 message sent to a remote domain as the codeset tcm so that the remote domain can know it. When a FML32 data is received from a remote domain, the encoding name included in the codeset tcm in the received message is used as the default encoding for the received FML32 data and set to the TypedFML32 object created by WTC. The application code received the data can know the encoding name by getRemoteMBEncoding( ).

An application code can also set an encoding name to each FLD_MBSTRING field by calling the setRemoteMBEncoding( ) method to the TypedMBString object for the field. If any valid encoding name is set to a FLD_MBSTRING field in the TypedFML32 object, it is used for the MBSTRING conversion instead of the default encoding described above. If the encoding name set to the FLD_MBSTRING field is null or invalid, the default encoding is used for the conversion. In summary, the order of the precedence of the encoding name used for the MBSTRING conversion for a FLD_MBSTRING field is as follows.

setRemoteMBEncoding( ) method of the TypedMBString object for the field
    setRemoteMBEncoding( ) method of the TypedFML32 object
    RemoteMBEncoding attribute of WTCResourcesMBean
    Java's default The following methods are required the changes due to FLD_MBSTRING added.

Fldtype( ), Fchg( ), Fadd( ), Fget( ), Fdel( )

The on-demand encoding methods and auto-conversion methods needed in Tuxedo such like Fmbpack( ) and Fmbunpack( ) are not needed by WTC.

Mapping File

The name of the mapping file is "mbencmapfile", which is a text-based file. The mapping file is placed in $WLHOME/server/lib directory as default and may also be customized by a user. An attribute is placed on the WTCResourcesMBean to define the path of the mapping file. It creates a HashMap with each "user_name java_name" pair. When an encoding conversion needs to be done, the user_name could be used as a key to retrieve the java_name to use. User_name as used herein means the names that are used in GNU iconv( ) library by default and may be changed if the user wants to change it for their own codeset encoding conversion.

Programming Specifics

Details of the MBString implementation in WTC in accordance with one embodiment of the present invention are provided below.

--- weblogic.wtc.jatmi
Class MBStringTypes
java.lang.Object
  |
  +- -weblogic.wtc.jatmi.StandardTypes
     |
     +- -weblogic.wtc.jatmi.MBStringTypes
public abstract class MBStringTypes
extends StandardTypes
implements TypedBuffer
    This class implements the common methods all of the MBSTRING require.
Constructor Summary
MBStringTypes(java.lang.String type, int index)
    Initializes the standard typed buffer of the given type at the
given index -continued Method Summary
Void    setRemoteMBEncoding(java.lang.String encode)
        Sets the encoding name of TypedMBString object
static java.lang.String    GetRemoteMBEncoding( )
        Returns the encoding name of TypedMBString object Constructor Detail
MBStringTypes
public MBStringTypes (java.lang.String type,
        int index)
    Initializes the standard typed buffer of the given type at the given index
    Parameters:
        type - The type of buffer
        index - The index of this type Method Detail
setRemoteMBEncoding
public void setMBEncode(java.lang.String encode)
    This function sets or changes the encoding name of TypedMBString object
Parameters:
    encode - encoding name
getRemoteMBEncoding
public java.lang.String getMBEncode( )
    This function gets encoding name of TypedMBString object and returns it.
Returns:
    A String object that is the encoding name of TypedMBString object         5.2 weblogic.wtc.jatmi
        Class TypedMBString java.lang.Object
  |
  +- -weblogic.wtc.jatmi.StandardTypes
      |
      +- -weblogic.wtc.jatmi.MBStringTypes
          |
          +- -weblogic.wtc.jatxai.TypedMBString public final class TypedMBString
extends weblogic.wtc.jatmi.MBStringTypes
implements weblogic.wtc.jatmi.TypedBuffer, java.io.Serializable
    This is the jatmi analogue to the MBSTRING Tuxedo buffer type
Author:
    BEA Systems, Inc.
See Also:
    weblogic.wtc.jatmi.StandardTypes
    weblogic.wtc.jatmi.TypedBuffer Constructor Detail
TypedM BString
public TypedMBString( )
    Generates a StringBuffer with the default capacity of 16
TypedMBString
public TypedMBString(int capacity)
    Creates an empty StringBuffer that has the initial capacity given
Parameters:
    capacity - The capacity the StringBuffer associated with this TypedMBString should have
TypedMBString
public TypedMBString(java.lang.String str)
    Constructor. Initializes object with a copy of the input string
Parameters:
    str - the string to initialize this object with Method Detail
getStringBuffer
public java.lang.StringBuffer getStringBuffer( )
    Gets the StringBuffer associated with this object. Note that the object returned is the
    same object store used by this object, so care should be taken when updating the object
    returned while this TypedMBString is used in another thread. Use the toString method on
    this object to return this object as a String.
Returns:
    The StringBuffer associated with this TypedMBString
_tmpresend
public void _tmpresend(java.io.DataOutputStream encoder)
    This function presends and encodes the given TypedBuffer object. It is equivalent to the
    combination of _tmpresend and _tmencdec functions from the buffer(3i) TUXEDO
    manual page.
    XDR encodes the given string. XDR encoding of a string is four length bytes (not
    including any NULL byte at the end) followed by the string itself (low 32 bits of the
    unicode characters). It is padded out to make the total length a multiple of four.
Parameters:
    encoder - The output stream to encode this type to. Should not be padded.

-continued

Throws:
    TPException -
        TPEINVAL - If there was some problem with the state of the TypedBuffer.
        Any other error is considered a fatal error
    IOException - If there was an error writing to the DataOutputStream _tmpostrecv
public void _tmpostrecv(java.io.DataInputStream decoder,
                      int recv_size)
    XDR decodes the given string. XDR encoding of a string is four length bytes (not
    including any NULL byte at the end) followed by the string itself (low 32 bits of the
    unicode characters). It is padded out to make the total length a multiple of four.
Parameters:
    decoder - A stream that starts with the encoded data for this buffer type. Only recv_size
    bytes should be read from the stream (though at the time this function is called all bytes
    necessary to decode this type should be available)
    recv_size - The total size of encoded data from the start position (note that encoded may
    be larger than the actual received size)
Throws:
    TPException - TPEINVAL if this stream could not be decoded for any reason toString
public java.lang.String toString( )
    Returns a copy of this object as a String                               1.3weblogic.wtc.jatmi
                              Class TypedFML32 java.lang.Object
   |
   +- -weblogic.wtc.jatmi.MBStringTypes
       |
       +--weblogic.wtc.jatmi.TypedFML32 public final class TypedFML32
extends MBStringTypes
implements TypedBuffer, java.io.Serializable, FML
    This implements TypedFML32 in JAVA as a TypedBuffer. Fieldids are generated with the tool
    mkfIdclass32, and then put into the buffer with the appropriate TypedFML32 methods. Note that in this
    implementation Fieldids must be combined into a field key, which is a combination of the Fldid32 and
    the occurance number. Any number of field tables can be loaded into any TypedFML32 object in order
    to do FldId to Stringconversions and String to FldId conversions.
Author:
    Copyright ® 2003 BEA Systems, Inc. All Rights Reserved.
See Also:
    FmlKey, FldTbl, TypedBuffer, mkfIdclass32, Serialized Form Field Summary

| | |
|---|---|
| protected java.util.HashMap | fldid_occs |
| protected java.util.TreeMap | fids |
| protected FldTb[ ] | fldtbls |
| protected int | indxintvl |
| protected int | len |
| protected int | magic |
| protected int | maxlen |
| protected int | nfields |
| protected int | nie |

Constructor Summary
TypedFML32( )
    Default constructor.
TypedFML32(FldTbl table)
    Constructor which provides a single FldTbl object for mapping FldIds to Strings
and Strings to FldIds Note that it is not necessary to provide FldTbls unless
String/FldId mappings are required.
TypedFML32(FIdTbl[ ] tables)
    Constructor which provides a list FldTbl objects for mapping FldIds to Strings
and Strings to FldIds.
TypedFML32(TypedFML32 copyFrom)
    This constructor copies the fields from the input FML32 buffer.

Method Summary

| | |
|---|---|
| void | tmpostrecv(java.io.DataInputStream decoder, int recv_size) |
| void | tmpresend(java.io.DataOutputStream encoder) |
| | This function presends and encodes the given TypedBuffer object. |
| void | Fadd(int fldid32, java.lang.Object value) |
| | Adds the given object. |
| void | Fchg(FmlKey key, java.lang.Object value) |
| | Adds the given object, whose field id is contained in key to the fielded buffer. |
| void | Fchg (int fldid, int occurance, java.lang.Object value) |
| | Adds the given object. |
| void | Fdel(FmlKey key) |
| | Delete given key from fielded buffer. |

-continued

| | |
|---|---|
| void | Fdel(int fldid, int occurrence)<br>Delete given element from fielded buffer. |
| java.lang.Object | Fget(FmlKey key)<br>Retrieves a copy of the object stored in the FML32 buffer of the given field id and occurrence number. |
| java.lang.Object | Fget(int fldid, int occurrence)<br>Retrieves a copy of the object stored in the FML buffer of the given field id and occurrence number. |
| java.util.Iterator | Fiterator( )<br>Returns an iterator for the start of the fielded FML32 buffer. |
| int | Fldid(java.lang.String name)<br>Returns the field id corresponding to the given name. |
| int | Fldno(int fldid32)<br>Given a fieldid, this returns the field number |
| int | Fldtype(int fldid32)<br>Given a fieldid, this returns the field type |
| java.lang.String | Fname(int fldid32)<br>Returns the string that matches the given fieldid. |
| int | Foccur(int fldid)<br>Returns the number of occurrences of the field specified by fldid |
| int | Fused( )<br>Returns the amount of space that this FML buffer will take when present |
| FldTbl[ ] | getFieldTables( )<br>gets the current list of FldTbls that are being used by this FML32 object to do FldId/String mappings. |
| protected boolean | hasPointerFields( )<br>Tells whether or not this buffer has any embedded pointers within it at all |
| void | setFieldTables(FldTbl[ ] tables)<br>This function sets the list of FldTbl objects that can be used for FldId/String mappings |

Methods inherited from class weblogic wtc.jatmi.StandardTypes
getHintIndex, getSubtype, getType, hint_to_type
Methods inherited from class java.lang.Object
clone, equals, finalize, getClass, hashCode, notify, notifyAll, toString, wait, wait, wait
Field Detail
magic
protected int magic
len
protected int len
maxlen
protected int maxlen
nfields
protected int nfields
nie
protected int nie
indxintvl
protected int indxintvl
flds
protected java.util.TreeMap flds
fldid_occs
protected java.util.HashMap fldid_occs
fldtbls
protected FldTbl[ ] fldtbls
Constructor Detail
TypedFML32
public TypedFML32( )
    Default constructor. Initializes an empty FML32 buffer.
TypedFML32
public TypedFML32(FldTbl[ ] tables)
    Constructor which provides a list FldTbl objects for mapping FldIds to Strings and
    Strings to FldIds. Note that it is not necessary to provide FldTbls unless
    String/FldId mappings are required.
    Parameters:
    tables - A list of FldTbl objects that can be used to map FldIds and strings
TypedFML32
public TypedFML32 (FldTbl table)
    Constructor which provides a single FldTbl object for mapping FldIds to Strings
    and Strings to FldIds Note that it is not necessary to provide FldTbls unless
    String/FldId mappings are required.
    Parameters:
    table - A FldTbl object that can be used to map FldIds and strings
TypedFML32
public TypedFML32(TypedFML32 copyFrom)
    This constructor copies the fields from the input FML32 buffer.

-continued

Parameters:
    copyFrom - The FML32 buffer to copy data from
Method Detail
setFieldTables
public void setFieldTables(FldTbl[ ] tables)
    This function sets the list of FldTbl objects that can be used for FldId/String
    mappings
    Specified by:
    setFieldTables in interface FML
    Parameters:
    tables - The list of tables to use for FldId/String mappings
    See Also:
    FldTbl
getFieldTables
public FldTbl[ ] getFieldTables( )
    gets the current list of FldTbls that are being used by this FML32 object to do
    FldId/String mappings.
    Specified by:
    getFieldTables in interface FML
    Returns:
    The list of FldTbl objects used for FldId/String mappings
Fldno
public int Fldno(int fldid32)
    Given a fieldid, this returns the field number
    Specified by:
    Fldno in interface FML
    Parameters:
    fldid32 - The field id from which to extract the field number
    Returns:
    The field number associated with this feild id
Fldtype
public int Fldtype(int fldid32)
    Given a fieldid, this returns the field type
    Specified by:
    Fldtype in interface FML
    Parameters:
    fldid32 - The field id from which to extract the field type
    Returns:
    The following field types:
        FLD_SHORT
        FLD_LONG
        FLD_CHAR
        FLD_FLOAT
        FLD_DOUBLE
        FLD_STRING
        FLD_CARRAY
        FLD_INT
        FLD_DECIMAL
        FLD_PTR
        FLD_FML32
        FLD_VIEW32
        FLD_MBSTRING
Fchg
public void Fchg(FmlKey key,
                java.lang.Object value)
       throws Ferror
    Adds the given object, whose field id is contained in key to the fielded buffer. key
    also contains the occurrence number of the field to add to the buffer. If an entry
    of that field id and occurrence exists in the buffer, this object will take its place. If
    there are no occurrence numbers prior to this occurrence number and field id
    then the occurrences prior to this one will be filled in with null entries. The
    following table gives the Field type and the associated object expected by FML
        FLD_SHORT - Short
        FLD_LONG - Integer
        FLD_CHAR - Character
        FLD_FLOAT - Float
        FLD_DOUBLE - Double
        FLD_STRING - String
        FLD_CARRAY - byte[ ]
        FLD_INT - Not yet supported
        FLD_DECIMAL - Not yet supported
        FLD_PTR - TypedBuffer
        FLD_FML32 - TypedFML32
        FLD_VIEW32 - Not yet supported
        FLD_MBSTRING - TypedMBString
    Specified by:
    Fchg in interface FML Parameters:
key - The fieldid and occurrence to add to the buffer
value - The element to add to the buffer. Note that this object must match the type
of object expected by the field type, or an invalid cast exception will be thrown
Throws:
Ferror - usually if space is low
See Also:
FmlKey
Fchg
public void Fchg(int fldid,
                 int occurance,
                 java.lang.Object value)
           throws Ferror
Adds the given object. This version of Fchg takes the fieldid and occurrence
number, and may be more convenient than the other version of Fchg which
requires an FmlKey to be constructed by the caller. If an entry of that field id and
occurrence exists in the buffer, this object will take its place. If there are no
occurrence numbers prior to this occurrence number and field id then the
occurrences prior to this one will be filled in with null entries. The following table
gives the Field type and the associated object expected by FML
       FLD_SHORT - Short
       FLD_LONG - Integer
       FLD_CHAR - Character
       FLD_FLOAT - Float
       FLD_DOUBLE - Double
       FLD_STRING - String
       FLD_CARRAY - bytefl
       FLD_INT - Not yet supported
       FLD_DECIMAL - Not yet supported
       FLD_PTR - TypedBuffer
       FLD_FML32 - TypedFML32
       FLD_VIEW32 - Not yet supported
       FLD_MBSTRING - TypedMBString
Specified by:
Fchg in interface FML
Parameters:
fldid - The fieldid to add to this buffer
occurrence - The occurrence number of the field to add
value - The element to add to the buffer. Note that this object must match the type
of object expected by the field type, or an invalid cast exception will be thrown
Throws:
Ferror - usually if space is low
See Also:
FmlKey
Fadd
public void Fadd(int fldid32,
                 java.lang.Object value)
           throws Ferror
Adds the given object. The following table gives the Field type and the
associated object expected by FML
       FLD_SHORT - Short
       FLD_LONG - Integer
       FLD_CHAR - Character
       FLD_FLOAT - Float
       FLD_DOUBLE - Double
       FLD_STRING - String
       FLD_CARRAY - byte[ ]
       FLD_INT - Not yet supported
       FLD_DECIMAL - Not yet supported
       FLD_PTR - TypedBuffer
       FLD_FML32 - TypedFML32
       FLD_VIEW32 - Not yet supported
       FLD_MBSTRING - TypedMBString
Parameters:
fldid32 - The fieldid to add to this buffer
value - The element to add to the buffer. Note that this object must match the type
of object expected by the field type, or an invalid cast exception will be thrown
Throws:
Ferror - usually if space is low
See Also:
FmlKey
Fget
public java.lang.Object Fget(FmlKey key)
           throws Ferror
Retrieves a copy of the object stored in the FML32 buffer of the given field id and
occurrence number. Notice that changing the object returned will NOT change
the value in the FML32 buffer. The value returned is a COPY of the value in the
FML32 buffer. The following table gives the Field type and the associated object
returned by FML -continued         FLD_SHORT - Short  
        FLD_LONG - Integer  
        FLD_CHAR - Character  
        FLD_FLOAT - Float  
        FLD_DOUBLE - Double  
        FLD_STRING - String  
        FLD_CARRAY - byte[ ]  
        FLD_INT - Not yet supported  
        FLD_DECIMAL - Not yet supported  
        FLD_PTR - TypedBuffer  
        FLD_FML32 - TypedFML32  
        FLD_VIEW32 - Not yet supported  
        FLD_MBSTRING - TypedMBString  
Specified by:  
Fget in interface FML  
Parameters:  
key - the field id and occurrence number of the element to retrieve  
Returns:  
the field object stored at that occurrence number  
Throws:  
Ferror - if the object is not found in the buffer among other reasons  
Fget  
public java.lang.Object Fget(int fldid,  
                        int occurrence)  
                    throws Ferror  
Retrieves a copy of the object stored in the FML buffer of the given field id and  
occurrence number. This version of the API takes the fieldid and occurrence  
number rather than the FmlKey Notice that changing the object returned will NOT  
change the value in the FML buffer. The value returned is a COPY of the value in  
the FML buffer. The following table gives the Field type and the associated object  
returned by FML  
        FLD_SHORT - Short  
        FLD_LONG - Integer  
        FLD_CHAR - Character  
        FLD_FLOAT - Float  
        FLD_DOUBLE - Double  
        FLD_STRING - String  
        FLD_CARRAY - byte[ ]  
        FLD_INT - Not yet supported  
        FLD_DECIMAL - Not yet supported  
        FLD_PTR - TypedBuffer  
        FLD_FML32 - TypedFML32  
        FLD_VIEW32 - Not yet supported  
        FLD_MBSTRING -TypedMBString  
Specified by:  
Fget in interface FML  
Parameters:  
fldid - The field id of the element to retrieve  
occurrence - The occurrence number of the element to retrieve  
Returns:  
the field object stored at that occurrence number  
Throws:  
Ferror - if the object is not found in the buffer among other reasons  
Fiterator  
public java.util.Iterator Fiterator( )  
        Returns an iterator for the start of the fielded FML32 buffer. An example usage  
        may be as follows. fml32iter = fm132obj.Fiterator( ); while(fm132iter.hasNext( )) {  
        entry = (Map.Entry)fm132iter.next( ); fmlkey = (FmlKey) entry.getKey( );  
        switch(Fldtype32(fmlkey.get_fldid( ))) { case FLD_SHORT: value_short = (Short)  
        entry.getValue( ); } }  
Specified by:  
Fiterator in interface FML  
Returns:  
the Iterator for the fielded FML32 buffer  
Foccur  
public int Foccur(int fldid)  
        Returns the number of occurrences of the field specified by fldid  
Specified by:  
Foccur in interface FML  
Parameters:  
fldid - the field id to look for in the fielded FML32 buffer  
Returns:  
the number of occurrences of a fldid in the fielded FML32 buffer  
hasPointerFields  
protected boolean hasPointerFields( )  
        Tells whether or not this buffer has any embedded pointers within it at all -continued Returns:
true if there exist any embedded pointers, including any pointer fields in
embedded TypedFML32 buffers Fdel
public void Fdel (FmlKey key)
    throws Ferror
    Delete given key from fielded buffer. The object with the given field id and the
    given occurrence will be removed from the buffer
    Specified by:
    Fdel in interface FML
    Parameters:
    key - The field id and occurrence of the element to be removed
    Throws:
    Ferror - if the element is not in the buffer among other reasons Fdel
public void Fdel(int fldid,
                 int occurrence)
    throws Ferror
    Delete given element from fielded buffer. The object with the given field id and
    the given occurrence will be removed from the buffer. This differs from the other
    version in that it takes the field id and occurrence number rather than a
    constructed key
    Specified by:
    Fdel in interface FML
    Parameters:
    fldid - The field id of the element to be removed
    occurrence - The occurrence of the element to be removed
    Throws:
    Ferror - if the element is not in the buffer among other reasons Fname
public java.lang.String Fname(int fldid32)
    throws Ferror
    Returns the string that matches the given fieldid. For this mapping a list of FldTbl
    objects should be loaded into this FML32 object.
    Specified by:
    Fname in interface FML
    Parameters:
    fldid32 - The field id to map to a string
    Returns:
    The name of the field
    Throws:
    Ferror.FBADFLD - if the mapping cannot be found Fldid
public int Fldid(java.lang.String name)
    throws Ferror
    Returns the field id corresponding to the given name. A table of FldTbl objects
    should be loaded into this FML32 object in order to map the name to a field id.
    Specified by:
    Fldid in interface FML
    Parameters:
    name - the name of the field we are trying to find
    Returns:
    The integer field id
    Throws:
    Ferror.FBADNAME - if the field id cannot be found Fused
public int Fused( )
    Returns the amount of space that this FML buffer will take when present
    Specified by:
    Fused in interface FML
    Parameters:
    The - size of this buffer when present _tmpresend
public void _tmpresend(java.io.DataOutputStream encoder)
    throws TPException,
           java.io.IOException
    This function presends and encodes the given TypedBuffer object. It is
    equivalent to the combination of _tmpresend and _tmencdec functions from the
    buffer(3i) TUXEDO manual page.
    XDR encodes the FML32 buffer
    Specified by:
    _tmpresend in interface TypedBuffer
    Parameters:
    encoder - The output stream to encode this type to. Should not be padded.

-continued

```
Throws:
TPException -
        TPEINVAL - If there was some problem with the state of the TypedBuffer.
        Any other errno is considered a fatal error
    java.io.IOException - If there was an error writing to the DataOutputStream
_tmpostreCV
public void _tmpostrecv(java.io.DataInputStream decoder,
                int recv_size)
            throws java.io.IOException,
                TPException
    Specified by:
    _tmpostrecv in interface TypedBuffer
```

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, implementing a connector between Tuxedo and WLS that implements the MBSTRING functionality.

The invention claimed is:

1. A computer-implemented method for supporting internationalization and localization of a software application in a connector between a distributed transactional server and an application server, comprising:

providing a first encoding system using a first set of encoding names, wherein the first encoding system is associated with a first application in a first programming language;

using, via the first application in the first programming language, the first encoding system to encode one or more abstract characters in a specific language into one or more specific integers based on the first set of encoding names;

providing a second encoding system using a second set of encoding names, wherein the second encoding system is associated with a second application in a second programming language, and wherein the second programming language provides a utility tool to convert data between the second encoding system and a uniform encoding system using the second set of encoding names;

receiving, at the second application in the second programming language, the one or more specific integers from the first application;

determining encoding information from the one or more specific integers, and mapping the determined encoding information using the first set of encoding names in the first encoding system into the second set of encoding names in the second encoding system based on a map file, wherein the map file contains a set of pairs of encoding names, wherein each said pair of encoding names contains an encoding name in the first set of encoding names and a corresponding encoding name in the second set of encoding names;

converting, on one or more processors, the encoded one or more abstract characters between the second encoding system and the uniform encoding system, via the utility tool provided by the second programming language, based on the mapped encoding information, and creating a distributed transaction data object based on the encoded one or more abstract characters, and providing the distributed transaction data object to a distributed transaction application via setting at least one of
- an encoding name for the distributed transaction data object;
- an encoding name for a specific remote distributed transaction domain; and
- an encoding name as a default encoding name for a programming language;

performing
- a first retrieval of the encoding name from the distributed transaction data object;
- a second retrieval of the encoding name from a specific remote distributed transaction domain, when the first retrieval is not successful; and
- a third retrieval of the encoding name from a default encoding name of a programming language, when the second retrieval is not successful; and using the encoding name to convert the encoded one or more abstract characters between a external encoding system, associated with the distributed transaction application, and the uniform encoding system.

2. A system for supporting internationalization and localization of a software application in a connector between a distributed transactional server and an application server, comprising:

a memory;

a processor;

a first encoding system that uses a first set of encoding names, wherein the first encoding system is associated with a first application in a first programming language, wherein the first application uses the first encoding system to encode one or more abstract characters in a specific language into one or more specific integers based on the first set of encoding names;

a second encoding system that uses a second set of encoding names, wherein the second encoding system is associated with a second application in a second programming language, and wherein the second programming language provides a utility tool to convert data between the second encoding system and a uniform encoding system using the second set of encoding names, wherein the second application in the second programming language operates to
- receive the one or more specific integers from the first application;
- determine encoding information from the one or more specific integers, and map the determined encoding information using the first set of encoding names in the first encoding system into the second set of encoding names in the second encoding system based on a map file, wherein the map file contains a set of pairs of encoding names, wherein each said pair of encoding names contains an encoding name in the first set of encoding names and a corresponding encoding name in the second set of encoding names; and
- convert the encoded one or more abstract characters between the second encoding system and the uniform encoding system, via the utility tool provided by the second programming language, based on the mapped encoding information, wherein a distributed transaction data object is created based on the encoded one or more abstract characters, and the distributed transaction data object is provided to a distributed transaction application via setting at least one of
- an encoding name for the distributed transaction data object;
- an encoding name for a specific remote distributed transaction domain; and
- an encoding name as an default encoding name for a programming language;

performing
- a first retrieval of the encoding name from the distributed transaction data object;
- a second retrieval of the encoding name from a specific remote distributed transaction domain, when the first retrieval is not successful; and
- a third retrieval of the encoding name from a default encoding name of a programming language, when the second retrieval is not successful; and using the encoding name to convert the encoded one or more abstract characters between a external encoding system, associated with the distributed transaction application, and the uniform encoding system.

3. A computer-readable storage medium containing instructions stored thereon, wherein the instructions when executed by a processor cause the processor to perform a method comprising:

providing a first encoding system using a first set of encoding names, wherein the first encoding system is associated with a first application in a first programming language;

using, via the first application in the first programming language, the first encoding system to encode one or more abstract characters in a specific language into one or more specific integers based on the first set of encoding names;

providing a second encoding system using a second set of encoding names, wherein the second encoding system is associated with a second application in a second programming language, and wherein the second programming language provides a utility tool to convert data between the second encoding system and a uniform encoding system using the second set of encoding names;

receiving, at the second application in the second programming language, the one or more specific integers from the first application;

determining encoding information from the one or more specific integers, and mapping the determined encoding information using the first set of encoding names in the first encoding system into the second set of encoding names in the second encoding system based on a map file, wherein the map file contains a set of pairs of encoding names, wherein each said pair of encoding names contains an encoding name in the first set of encoding names and a corresponding encoding name in the second set of encoding names;

converting the encoded one or more abstract characters between the second encoding system and the uniform encoding system, via the utility tool provided by the second programming language, based on the mapped encoding information; and creating a distributed transaction data object based on the encoded one or more abstract characters, and providing the distributed transaction data object to a distributed transaction application via
setting at least one of
an encoding name for the distributed transaction data object;
an encoding name for a specific remote distributed transaction domain; and
an encoding name as a default encoding name for a programming language;
performing
a first retrieval of the encoding name from the distributed transaction data object;
a second retrieval of the encoding name from a specific remote distributed transaction domain, when the first retrieval is not successful; and
a third retrieval of the encoding name from a default encoding name of a programming language, when the second retrieval is not successful; and
using the encoding name to convert the encoded one or more abstract characters between a external encoding system, associated with the distributed transaction application, and the uniform encoding system.

4. The method of claim 1, further comprising:
allowing the first application to run on a distributed transaction processing system, and allowing the second application to run on an application server.

5. The method of claim 1, further comprising:
allowing the first encoding system to be associated with a first conversion library and the second encoding system is associated with a second conversion library.

6. The method of claim 1, further comprising:
using the map file to create a HashMap to address the differences between the first set of encoding names and the second set of encoding names, wherein any one of the first set of encoding names operates to be used as a key to retrieve from the HashMap a corresponding encoding name in the second set of encoding names.

7. The method of claim 1, further comprising:
allowing the uniform encoding system to use a UNICODE codeset.

8. The method of claim 1, further comprising:
performing get and set of particular codeset information either programmatically or administratively.

9. The method of claim 1 further comprising:
allowing users to choose their preferred encoding.

\* \* \* \* \*

UNITED STATES PATENT AND TRADEMARK OFFICE
CERTIFICATE OF CORRECTION

| | | |
|---|---|---|
| PATENT NO. | : 7,849,085 B2 | Page 1 of 1 |
| APPLICATION NO. | : 10/848244 | |
| DATED | : December 7, 2010 | |
| INVENTOR(S) | : Masayuki Taniai et al. | |

It is certified that error appears in the above-identified patent and that said Letters Patent is hereby corrected as shown below:

In column 2, line 42, delete "I10n," and insert -- 110n, --, therefor.

In column 2, line 43, delete ""1"" and insert -- "I" --, therefor.

In column 3, line 11, delete "form" and insert -- from --, therefor.

In column 3, line 51-52, delete "weblogic.wtcjatmi.TypedMBString" and insert
-- weblogic.wtc.jatmi.TypedMBString --, therefor.

In column 3, line 59, delete "weblogic.wtcjatmi.TypedString" and insert
-- weblogic.wtc.jatmi.TypedString --, therefor.

In column 5, line 41, delete "whichextends" and insert -- which extends --, therefor.

In column 13, line 30, delete "feild" and insert -- field --, therefor.

In column 22, line 63, in claim 1, delete "information," and insert -- information; --, therefor.

Signed and Sealed this
Ninth Day of August, 2011

David J. Kappos
*Director of the United States Patent and Trademark Office*